(12) United States Patent
Lovett

(10) Patent No.: US 8,608,201 B2
(45) Date of Patent: Dec. 17, 2013

(54) COMBINATION TRAY RACK AND TRAILER

(76) Inventor: Gregory Lovett, Branch, MI (US)

(*) Notice: Subject to any disclaimer, the term of this patent is extended or adjusted under 35 U.S.C. 154(b) by 20 days.

(21) Appl. No.: 13/239,954

(22) Filed: Sep. 22, 2011

(65) Prior Publication Data

US 2013/0076015 A1 Mar. 28, 2013

(51) Int. Cl.
*B60R 9/06* (2006.01)
*B60P 9/00* (2006.01)

(52) U.S. Cl.
USPC .......................... 280/769; 414/462

(58) Field of Classification Search
USPC ........... 280/30, 656, 47.18; 414/462; 224/401
See application file for complete search history.

(56) References Cited

U.S. PATENT DOCUMENTS

| | | | | |
|---|---|---|---|---|
| 3,436,096 A | * | 4/1969 | Rogge | 280/762 |
| 3,536,339 A | * | 10/1970 | Fichtenberg | 280/414.5 |
| 3,902,733 A | * | 9/1975 | David | 280/47.18 |
| 4,057,283 A | * | 11/1977 | Barnett | 296/173 |
| 5,501,481 A | * | 3/1996 | Chumley et al. | 280/476.1 |
| 6,042,135 A | * | 3/2000 | Ross | 280/456.1 |
| 6,254,117 B1 | * | 7/2001 | Cross | 280/401 |
| 2001/0026060 A1 | * | 10/2001 | Cross | 280/456.1 |
| 2004/0100045 A1 | * | 5/2004 | Amacker | 280/30 |
| 2006/0038384 A1 | * | 2/2006 | Cumbie | 280/656 |
| 2006/0097482 A1 | * | 5/2006 | Cumbie | 280/491.3 |

\* cited by examiner

*Primary Examiner* — Paul N Dickson
*Assistant Examiner* — Bridget Avery
(74) *Attorney, Agent, or Firm* — Dale J. Ream

(57) ABSTRACT

A combination tray rack and trailer device attaches to a vehicle, such as an ATV. The device may be used in a first mode as a tray rack and may be used to help load game or equipment into the tray rack. The device may also be used in a second mode, as a two wheel cart or trailer. The device may plug into the ATV receiver. In still another embodiment, the device may be removed from the ATV and may be used as a two-wheeled cart.

7 Claims, 3 Drawing Sheets

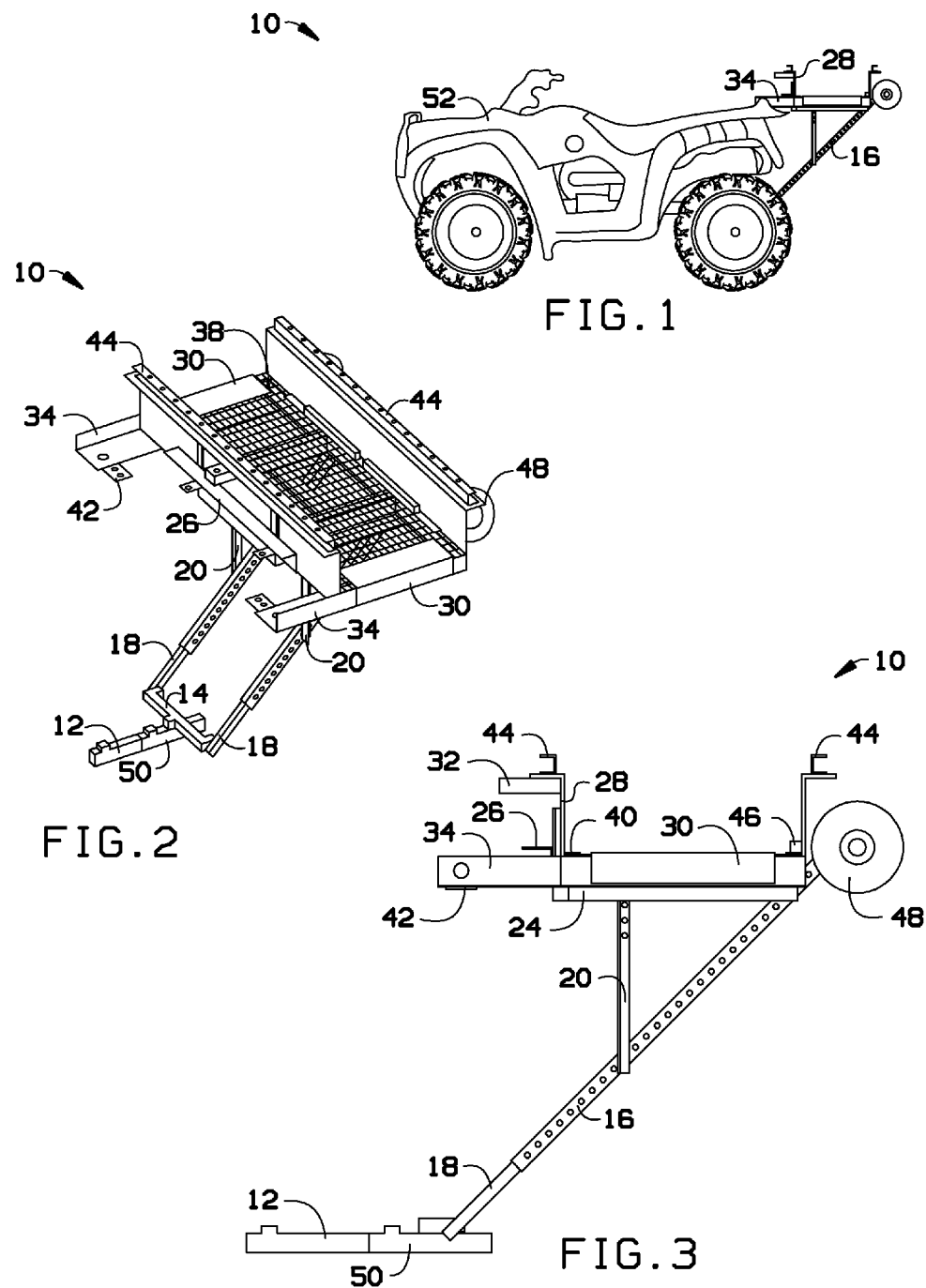

COMBINATION TRAY RACK AND TRAILER

BACKGROUND OF THE INVENTION

The present invention relates to a tray rack and trailer and, more particularly, to an all-terrain vehicle (ATV) combination tray rack and trailer that can be used to manually load game and equipment.

Conventionally, if a person wishes to tow a trailer behind their ATV, they would connect a trailer to the ATV receiver. If a person wishes to have a tray rack on their ATV, this would typically be a separate piece of equipment, connected to the ATV, to act as a tray rack.

As can be seen, there is a need for a single piece of equipment that can act at both a tray rack and a trailer for a vehicle, such as an ATV.

SUMMARY OF THE INVENTION

In one aspect of the present invention, a combination tray rack and trailer device comprises a tray rack movable between a first mode, where the tray rack in a tray rack position when attached to a vehicle, and a second mode, where the tray rack is in a trailer position when attached to a vehicle.

In another aspect of the present invention, a combination tray rack and trailer device comprises a tray rack movable between a first mode, where the tray rack in a tray rack position when attached to a vehicle, and a second mode, where the tray rack is in a trailer position when attached to a vehicle; a tray rack frame adapted to support the tray rack on the draw bars; a hitch assembly adapted to connect to a receiver of the vehicle; a swivel bar adapted to be connected to the hitch assembly; draw bars attached to and extending from opposite ends of the swivel bar; and wheels attached to distal ends of the draw bars, wherein the draw bars are angled away from ground when the tray rack is in the first mode and the draw bars are substantially parallel with the ground when the tray rack is in the second mode.

These and other features, aspects and advantages of the present invention will become better understood with reference to the following drawings, description and claims.

BRIEF DESCRIPTION OF THE DRAWINGS

FIG. 1 is a side view of a combination tray rack and trailer according to an exemplary embodiment of the present invention;

FIG. 2 is a perspective view of the combination tray rack and trailer of FIG. 1;

FIG. 3 is a side view of the combination tray rack and trailer of FIG. 1;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a combination tray rack and trailer that may attach to a vehicle, such as an ATV. The device may be used in a first mode as a tray rack and may be used to help load game or equipment into the tray rack. The device may also be used in a second mode, as a two wheel cart or trailer. The device may plug into the ATV receiver. In still another embodiment, the device may be removed from the ATV and may be used as a two-wheeled cart.

Figure 4:
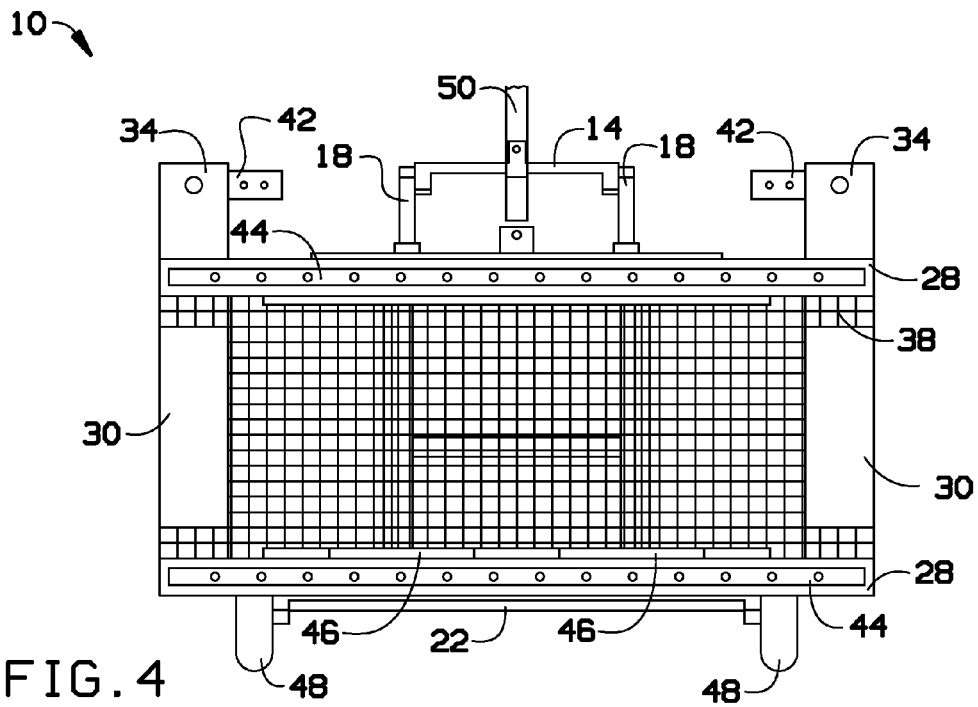
FIG. 4 is a top view of the combination tray rack and trailer of FIG. 1.
Figure 5:
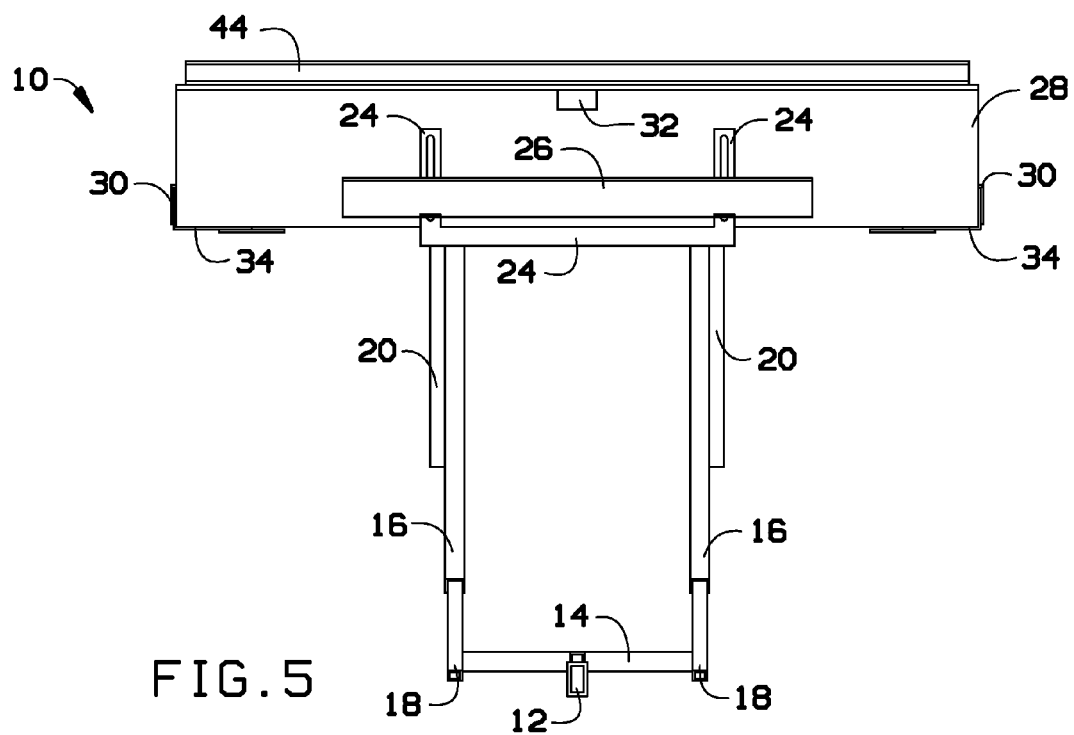
FIG. 5 is a front view of the combination tray rack and trailer of FIG. 1.
Figure 6:
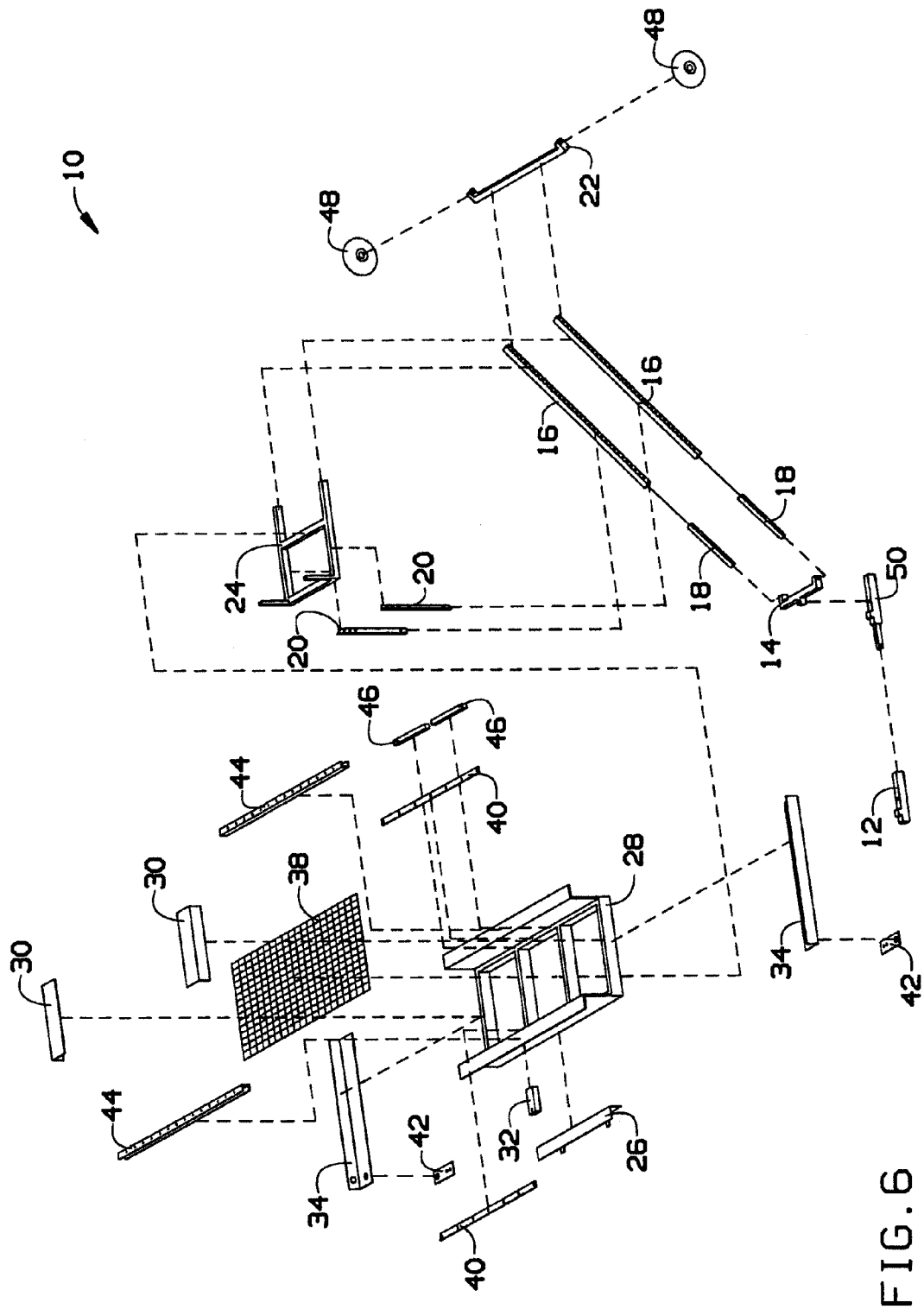
FIG. 6 is an exploded perspective view of the combination tray rack and trailer of FIG. 1.

Referring now to FIGS. 1 through 6, a combination tray rack and trailer 10 (also referred to as device 10) may be attached to an ATV 52. While the below embodiment describes the cart being used on an ATV, the device 10 may also be used on other vehicles, such as farm tractors, lawn tractors, golf carts, snowmobiles, and the like. While the device 10 is shown in the tray rack mode in the drawings, one can envision how the device 10 may be used as a trailer or a cart, as described in greater detail in the paragraphs that follow.

A hitch assembly 12 may fit into a receiver (not shown) of the ATV 52. The hitch assembly 12 may include an optionally auxiliary receiver 50. The auxiliary receiver 50 may connect to the hitch assembly 12 to extend the length of the hitch assembly 12. The hitch assembly 12 may be, for example, made of steel tubing, such as 1.25 inch steel tubing. The auxiliary receiver 50 may be made from similar materials.

The hitch assembly 12 (or the auxiliary receiver 50) may connect to a swivel bar 14. A pin (not shown) may be used to connect the swivel bar 14 with the hitch assembly 12. When in a tray rack mode, the pin may fix the swivel bar 14 to the hitch assembly 12. When in a trailer mode, the pin may be designed to allow the swivel bar to pivot relative to the hitch assembly 12. Adjustment bars 18 may be bolted or otherwise attached to the swivel bar 14. The adjustment bars 18 may pivot relative to the swivel bar 14, thereby allowing the device 10 to move up and and down when used as a trailer (or when used as a game/equipment loader) and allowing the tray rack to be positioned, as described below.

The adjustment bars 18 may fit into drawbars 16. The length of the adjustment bars 18 that extends from the drawbars 16 may be adjusted to vary the height of the device 10 when in a tray rack mode. The drawbars 16 may have a plurality of spaced-apart holes formed therethrough. These holes may be used to adjust the length of the adjustment bars 18 that extends from the drawbars 16. These holes may also be used to position angle braces 20, as discussed below. The drawbars 16 may be, for example, 1 inch steel tubing. In some embodiments, the drawbars 16 may be made of angle iron or some other material. The adjustment bars 18 may be, for example, ¾ inch steel tubing. In some embodiments, two adjustment bars 18 and two drawbars 16 may be used, one disposed on each end of the swivel bar 14. The drawbars 16, as discussed below, may be angled relative to the ground, when in the tray rack position, and may be substantially parallel to the ground when the device 10 is in the trailer position.

An axle assembly 22 may be attached to an end of each drawbar 16. Wheels 48 may be rotatably attached to each side of the axle assembly 22.

The angle brace 20 may attach into one of the holes on each of the drawbars 16. The angle brace 20 may support the front of a tray rack frame 24. The back of the tray rack frame 24 may pivotably attach to holes on each of the drawbars 16. The tray rack frame 24 may support a tray rack 28.

A rest bar 26 may be provided at the front of the tray rack frame 24. The rest bar 26 may rest against the ATV when the device 10 is in a tray rack mode. Side rails 30 may be disposed on the sides of the tray rack 28. A tray rack screen 38 may be disposed on the bottom of the tray rack 28. Screen brackets 40 may be used to secure the screen 38 to the tray rack 28. A quick connection pin block 34 may be provided to secure the loaded tray rack 28 to the vehicle (such as the ATV 52). Some installations may use one pin and two fastener knobs and some installations may use two pins.

Leverage load arms 34 may extend from the front of the tray rack 28. When loading equipment or game into the tray rack 28, the leverage loading arms 34 may slide on to the back of the ATV 52, taking some of the weight away from the person lifting the tray rack 28 from the trailer position to the tray rack position. Leveraging load arm fastening brackets 42 may be used to connect the leveraging load arms 34 to the ATV 52. Tie down brackets 44 may be positioned on one or more sides of the tray rack 28 to provide a location to attach tie downs, such as bungee cords.

The device 10 may be used as a tray rack for hauling bait, equipment, supplies, game or the like. The device 10 may also be used as a trailer by disconnecting the leveraging load arm fastening brackets 42 from the ATV 52 and disconnecting the angle braces 20 from the drawbars 16 to allow the tray rack 28 to lower onto the drawbars 16. A pin (not shown) may be removed between the hitch assembly 12 and the swivel bar 14 to permit the swivel tray rack 28 (and related assembly) to pivot relative to the hitch assembly 12 while being towed.

The device 10 may also be used to load game or other heavy equipment into the tray rack 28. When in the trailer mode, the game may need only to be lifted a short height. Once in the tray rack 28, the leverage load arms 24 may be placed on the back of the ATV 52 and the tray rack 28 raised into position. Finally, the device 10 may be used as a two-wheeled cart by removing the hitch assembly 12 from the receiver of the ATV 52.

It should be understood, of course, that the foregoing relates to exemplary embodiments of the invention and that modifications may be made without departing from the spirit and scope of the invention as set forth in the following claims.

What is claimed is:

1. A combination tray rack and trailer device for use with an all-terrain vehicle ("ATV"), comprising:
    a tray rack selectively movable between a first mode where the tray rack is in a tray rack position when attached to the ATV, and a second mode where the tray rack is in a trailer position when attached to the ATV;
    wherein said tray rack includes:
        opposed sides;
        a front side extending between front ends of said opposed sides;
        a tie down bracket extending upwardly from said front side and extending between said front ends of said opposed sides;
        a pair of leverage load arms attached to respective front ends of said opposed sides of said tray rack, said leverage load arms extending frontwardly away from said front side and being spaced apart from one another so as to selectively slide onto the ATV at said first mode; and
        a pair of leverage load arm fastening brackets coupled to respective free ends of respective leverage load arms, said pair of leverage load arm fastening brackets extending inwardly from said respective leverage load arms and configured to selectively fasten to the ATV.

2. The device of claim 1, further comprising:
    a hitch assembly adapted to connect to a receiver of the vehicle;
    a swivel bar adapted to be connected to the hitch assembly;
    draw bars attached to and extending from opposite ends of the swivel bar; and
    wheels attached to distal ends of the draw bars, wherein the draw bars are angled away from the ground when the tray rack is in the first mode and the draw bars are substantially parallel with the ground when the tray rack is in the second mode.

3. The device of claim 1, further comprising a rest bar disposed along a front edge of the tray rack.

4. The device of claim 1, further comprising a tray rack screen disposed in the tray rack.

5. The device of claim 2, further comprising a tray rack frame adapted to support the tray rack on the draw bars.

6. A combination tray rack and trailer device for use with an all terrain vehicle ("ATV"), comprising:
    a tray rack movable between a first mode, where the tray rack is in a tray rack position when attached to the ATV, and a second mode, where the tray rack is in a trailer position when attached to the ATV;
    a tray rack frame;
    a hitch assembly adapted to connect to a receiver of the vehicle;
    a swivel bar selectively connected to the hitch assembly;
    draw bars attached to and extending from opposite ends of the swivel bar, wherein the tray rack frame is adapted to support the tray rack on the draw bars; and
    wheels attached to distal ends of the draw bars, wherein the draw bars are angled away from ground when the tray rack is in the first mode and the draw bars are substantially parallel with the ground when the tray rack is in the second mode;
    a pair of spaced apart leverage load arms having first ends coupled to opposed ends of a front of said tray rack, each leverage load arm extending frontwardly away from said front and having a free end opposed from a respective load arm first end; and
    a pair of leverage load arm fastening brackets coupled to respective free ends of respective leverage load arms, said pair of leverage load arm fastening brackets extending inwardly from said respective leverage load arms and configured to selectively fasten to the ATV.

7. The device of claim 6, further comprising one or more tie down brackets positioned on the tray rack and extending upwardly therefrom.

\* \* \* \* \*